April 7, 1931.   H. M. JENNINGS   1,800,077
INTERNAL COMBUSTION ENGINE PISTON
Filed May 6, 1930
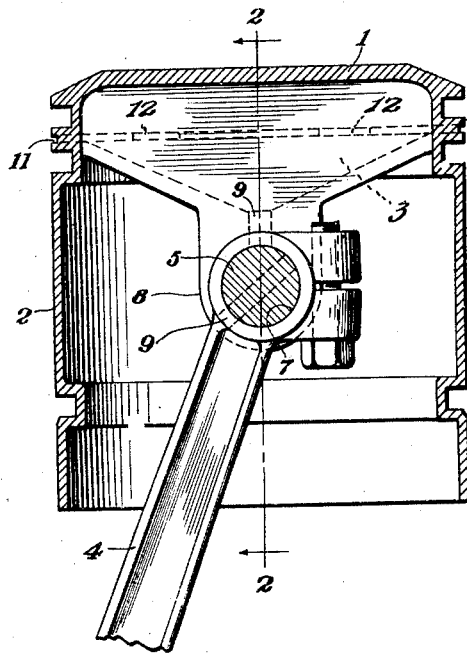
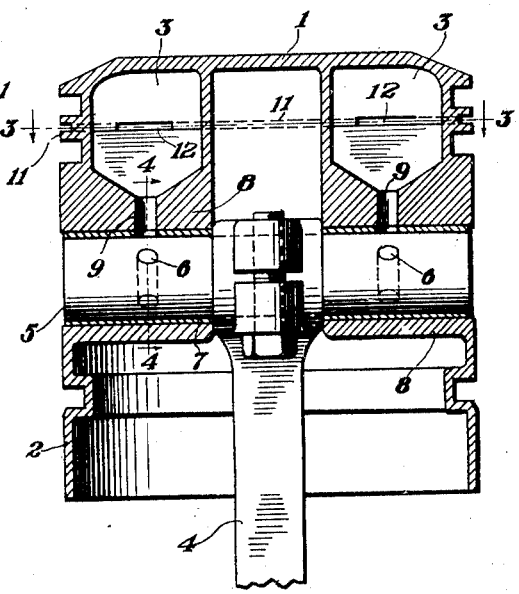
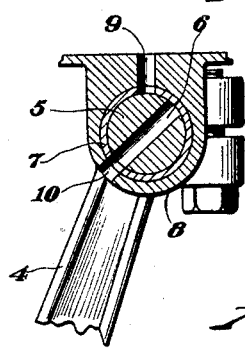
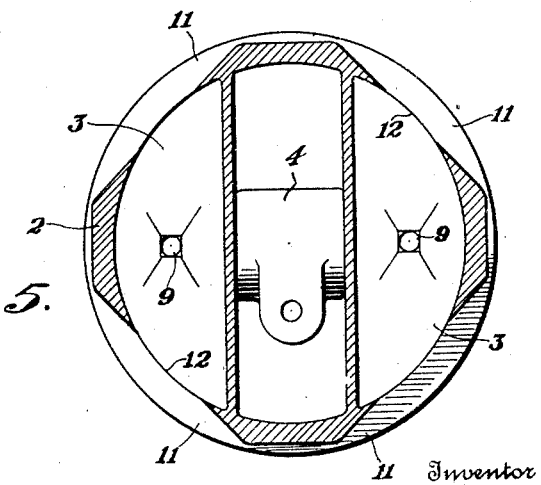
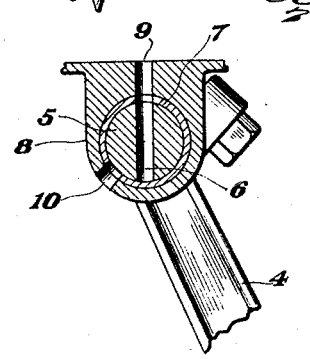
Inventor
H. M. Jennings
By Lally & Lally, Attorneys Patented Apr. 7, 1931

1,800,077

UNITED STATES PATENT OFFICE

HENRY M. JENNINGS, OF HILLSBORO, TEXAS

INTERNAL-COMBUSTION-ENGINE PISTON

Application filed May 6, 1930. Serial No. 450,234.

There is a tendency of internal combustion engines to pump oil. This is objectionable because it results in fouling of the spark plugs and consequent misfiring of the engine, carbonizing of the valves and engine resulting in knocking, loss of power and irregular running, and a waste of the oil.

Therefore, it is the primary object of this invention to prevent the oil passing around the piston into the working chamber of the cylinder and, at the same time, admit of proper lubrication of the piston and cylinder without waste of the lubricant.

In accordance with the invention, the piston is provided with two interior chambers adjacent the head and in spaced relation to provide clearance for the connecting rod. Channels in the outer surface of the piston collect the surplus oil and direct it into the said chambers. An outlet from each of the chambers connects with the opening in which the connecting rod pin is fitted and this opening has an outlet for the escape of the oil to return to the source of supply for redistribution. The connecting rod pin is formed with a transverse opening for each of the chambers for alternate registration with the outlet thereof and the outlet of the pin receiving opening.

While the drawings illustrate a preferred embodiment of the invention, it is to be understood that in adapting the means to meet specific needs and requirements, the design may be varied and changes in the minor details of construction may be resorted to within the scope of the invention as claimed without departing from the spirit thereof.

For a full understanding of the invention and the merits thereof, reference is to be had to the following description and the drawings hereto attached, in which:

Figure 1 is a central longitudinal sectional view of a piston illustrative of an embodiment of the invention.

Figure 2 is a similar sectional view on the line 2—2 of Figure 1, looking to the left, as indicated by the arrows.

Figure 3 is a horizontal sectional view on the line 3—3 of Figure 2,

Figure 4 is a fragmentary sectional view on the line 4—4 of Figure 2, showing the outlet from the chamber closed and the outlet from the pin opening in register with the oil passage formed in the pin.

Figure 5 is a view similar to Figure 4, showing the outlet from the pin opening closed and the oil passage of the pin registering with the outlet of the chamber.

Corresponding and like parts are referred to in the following description and designated in the several views of the drawings by like reference characters.

The piston illustrated is of conventional construction and comprises a head 1 and body 2 in which is formed the usual grooves for reception of the accustomed resilient packing rings. Two chambers 3 are formed within the piston adjacent the head 1 and are transversely spaced, as indicated most clearly in Figure 2 of the drawings, to provide clearance for the connecting rod 4. The numeral 5 designates the pin which forms connecting means between the piston and connecting rod 4. This pin is preferably solid and has an opening 6 formed transversely therein adjacent each end to provide an oil passage. The pin 5 fits snugly in an opening 7 formed in bosses 8 extending inwardly from opposite sides of the body 2 and forming a part thereof. The openings 7 have bushings fitted therein in a manner well understood. An outlet 9 is formed in the bottom of each of the chambers 3 and extends into the pin opening 7. An opening 10 is formed in the bottom portion of the bosses 8 in which the pin 5 is mounted and connects with the pin opening 7 and constitutes an outlet for the discharge of the oil from the passage 6. The openings 9 and 10 are out of line, thereby preventing the passage 6 communicating therewith at the same time. As shown in Figure 4 of the drawings, the passage 6 is closed to the opening 9 and connects with the opening 10 and, as indicated in Figure 5, the passage 6 connects with the opening 9 and is closed to the opening 10. This prevents any loss of pressure that may accumulate in the chambers 3.

Channels 11 are formed in the outer surface of the piston to receive surplus oil collecting on the side of the cylinder in which the piston may be located. For convenience, the oil-gathering channels 11 are formed in that portion of the piston lying between adjacent packing grooves adjacent the head of the piston. The channels 11 may be formed in any manner and usually consist of shallow cuts which are sufficiently deep at a middle point to connect with the chambers 3, as indicated at 12.

A piston constructed in accordance with the invention removes surplus oil from the sides of the cylinder and leaves a film for proper lubrication. The surplus oil removed from the sides of the cylinder enters the channels 11 and passes into the chambers 3 through the openings 12. As the piston reciprocates, the connecting rod 4 oscillates and in one position, as indicated in Figure 5 of the drawings, the passage 6 connects with the outlet 9 and receives oil from the chamber 3, and in another position, as indicated in Figure 4, the passage 6 registers with the opening 10 and admits of the oil discharging through said opening 10 to return to the oil pan or other source for redistribution in the continued operation of the engine. It is observed that any pressure from the working chamber of the cylinder finding its way into the chambers 3, is prevented from direct escape because of the disposition of the openings 6, 9, and 10 which are prevented from registering at the same time.

The floor of the chambers 3 slopes toward the outlets 9 to prevent an accumulation of oil and insure a quick drainage. The piston pin is surrounded by a film of oil which obviates wear and noise.

What is claimed is:

1. A piston of the character specified provided with inner oil chambers adjacent the head and in spaced relation, and having surface oil collecting channels opening into the oil chambers, the latter having outlets, said piston having the opening for the connecting rod pin provided with outlets and connecting with the outlets from the oil chambers, and the connecting rod pin snugly fitting in the said opening and having transverse passages adapted to alternately register with the respective outlets from the oil chambers and pin opening.

2. A piston of the character specified provided adjacent its head with packing grooves and having inner oil chambers adjacent the head in spaced relation, and having oil collecting channels formed in that part of the piston disposed between adjacent packing grooves, each of the oil chambers having an outlet, the opening for the connecting rod pin being in communication with the outlets of the oil chambers and having outlets, and a pin snugly fitted in the pin opening and provided with transverse oil passages adapted to alternately register with the outlets of the oil chambers and the outlets of the said pin openings.

In testimony whereof I affix my signature.

HENRY M. JENNINGS. [L. S.]